(12) United States Patent
Narita et al.

(10) Patent No.: US 7,360,356 B2
(45) Date of Patent: Apr. 22, 2008

(54) EXHAUST GAS PURIFYING APPARATUS FOR INTERNAL COMBUSTION ENGINE

(75) Inventors: Yuji Narita, Kariya (JP); Yoshiyuki Takahashi, Kariya (JP); Hisanobu Suzuki, Toyota (JP)

(73) Assignees: Kabushiki Kaisha Toyota Jidoshokki, Kariya-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/394,553

(22) Filed: Mar. 31, 2006

(65) Prior Publication Data

US 2006/0218899 A1  Oct. 5, 2006

(30) Foreign Application Priority Data

Mar. 31, 2005   (JP)   ............. 2005-105020

(51) Int. Cl.
*F01N 3/00* (2006.01)
(52) U.S. Cl. ............. 60/285; 60/286; 60/295; 60/303; 123/198 F; 123/418
(58) Field of Classification Search ......... 60/276, 60/285, 286, 295, 303; 123/198 F, 481
See application file for complete search history.

(56) References Cited

U.S. PATENT DOCUMENTS

| | | | | |
|---|---|---|---|---|
| 4,134,261 | A * | 1/1979 | Iizuka et al. ............. | 60/276 |
| 6,023,929 | A * | 2/2000 | Ma ............. | 60/295 |
| 6,408,618 | B2 * | 6/2002 | Ide ............. | 60/285 |
| 6,951,098 | B2 * | 10/2005 | Xu et al. ............. | 60/286 |
| 7,055,311 | B2 * | 6/2006 | Beutel et al. ............. | 60/285 |
| 7,069,718 | B2 * | 7/2006 | Surnilla et al. ............. | 60/284 |
| 2004/0118107 | A1 | 6/2004 | Ament | |

FOREIGN PATENT DOCUMENTS

| | | |
|---|---|---|
| EP | 0 683 311 A1 | 11/1995 |
| EP | 0 937 879 A2 | 8/1999 |
| JP | 11-294146 | 10/1999 |
| JP | 2004-308433 | 11/2004 |
| WO | WO 03/048533 | 6/2003 |

* cited by examiner

*Primary Examiner*—Binh Q. Tran
(74) *Attorney, Agent, or Firm*—Morgan & Finnegan, LLP

(57) ABSTRACT

A main control computer commands a second sub-control computer to perform a reduced-cylinder operation when the coolant temperature detected by a coolant temperature sensor is greater than or equal to a reference temperature, and the exhaust temperature detected by a temperature sensor is less than a reference exhaust temperature and is within a reduced-cylinder operation allowable range in which a combination of the engine speed and the engine load is set in advance. The second sub-control computer deactivates a second cylinder group based on a command of the reduced-cylinder operation. The main control computer commands a first sub-control computer and the second sub-control computer to perform an all-cylinder operation when the coolant temperature detected by the coolant temperature sensor is less than the reference temperature, and the exhaust temperature detected by the temperature sensor is greater than or equal to the reference exhaust temperature or is out of the reduced-cylinder operation allowable range in which a combination of the engine speed and the engine load is set in advance.

14 Claims, 5 Drawing Sheets

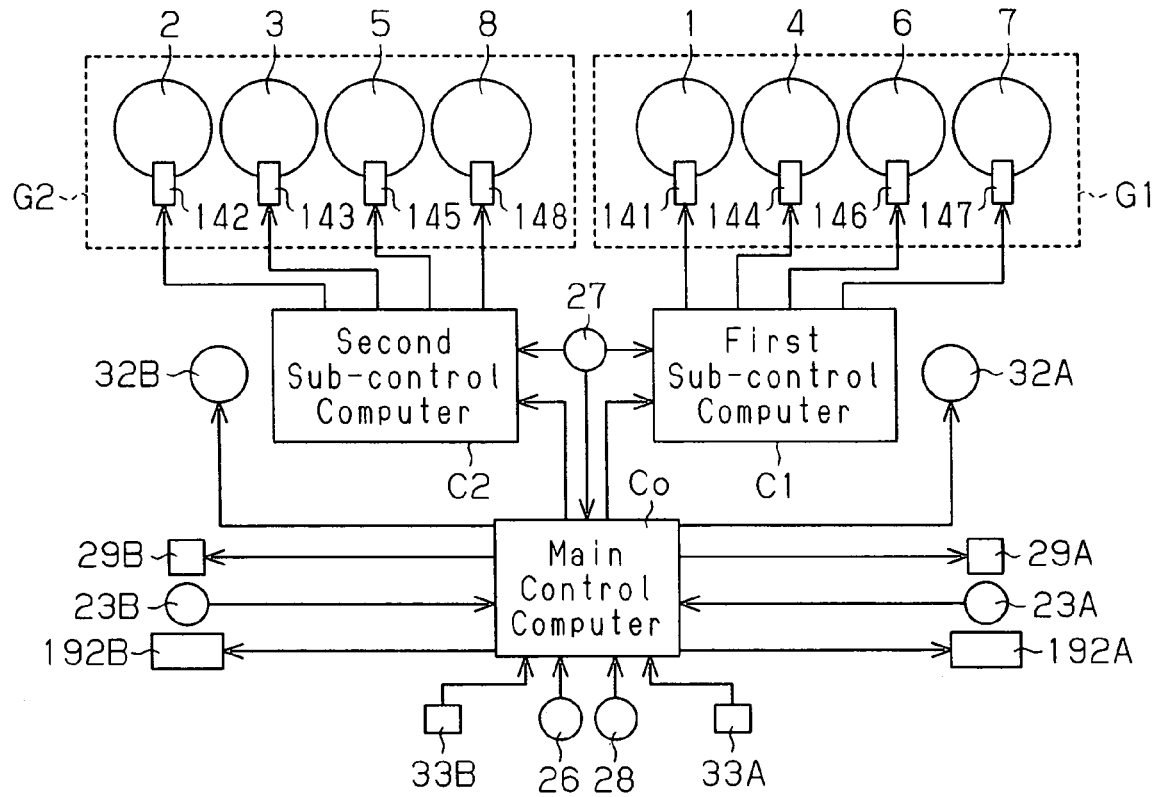

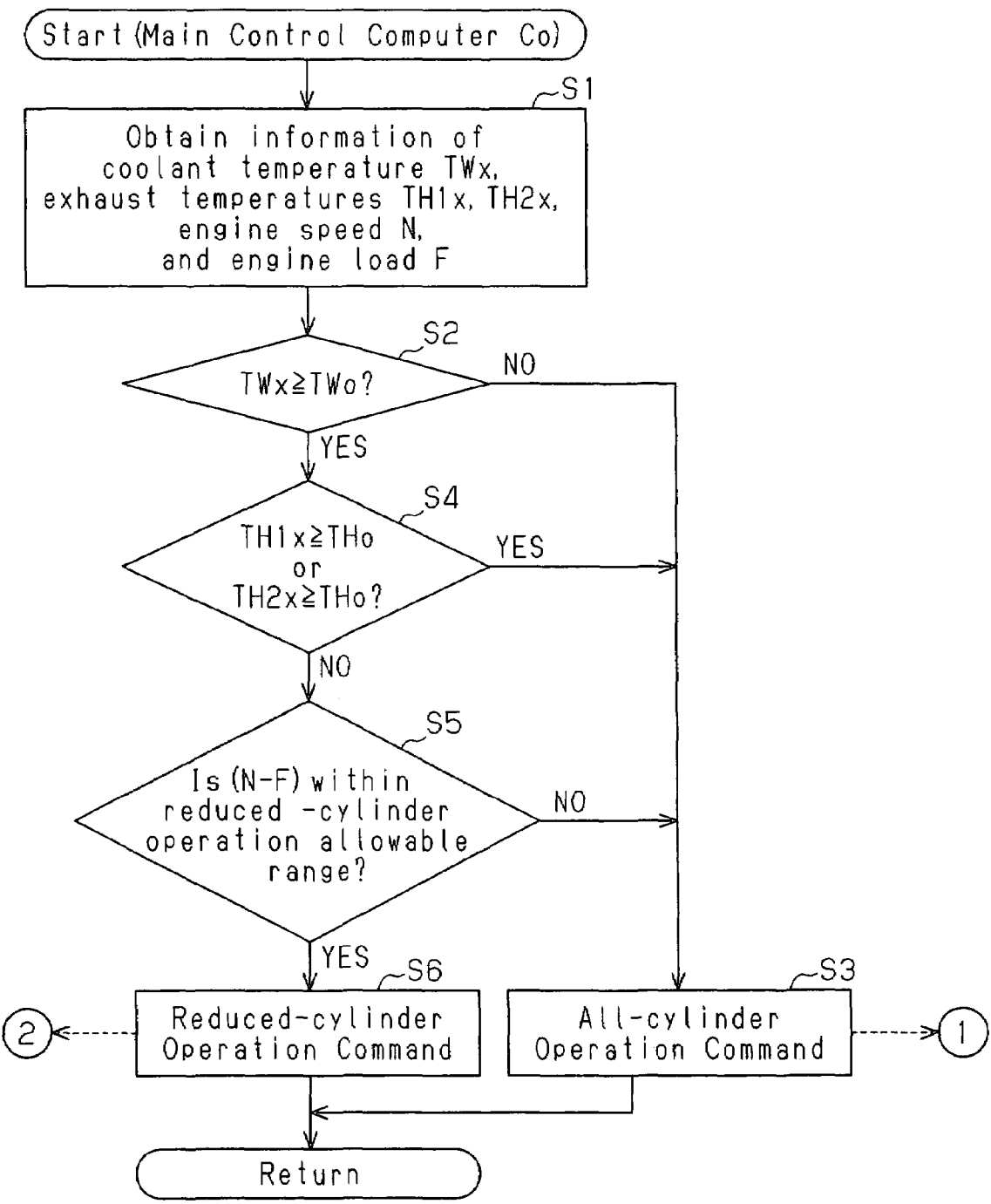

Fig.6(A)

| Crank Angle | All-cylinder Operation | Reduced-cylinder Operation 1 | Reduced-cylinder Operation 2 | Reduced-cylinder Operation 3 | Reduced-cylinder Operation 4 |
|---|---|---|---|---|---|
| 0 | 1 | 1 | 1 | 1 | 1 |
| 90 | 2 |  |  |  |  |
| 180 | 7 | 7 | 7 | 7 | 7 |
| 270 | 3 | 3 |  |  |  |
| 360 | 4 | 4 | 4 | 4 | 4 |
| 450 | 5 | 5 | 5 |  |  |
| 540 | 6 | 6 | 6 | 6 | 6 |
| 630 | 8 | 8 | 8 | 8 |  |
| 720 | 1 | 1 | 1 | 1 | 1 |

Fig.6(B)

| Crank Angle | All-cylinder Operation | Reduced-cylinder Operation 1 | Reduced-cylinder Operation 2 | Reduced-cylinder Operation 3 | Reduced-cylinder Operation 4 | Reduced-cylinder Operation 5 | Reduced-cylinder Operation 6 | Reduced-cylinder Operation 7 |
|---|---|---|---|---|---|---|---|---|
| 0 | 1 | 1 | 1 | 1 | 1 | 1 | 1 | 1 |
| 90 | 2 |  |  |  |  |  |  |  |
| 180 | 7 | 7 | 7 | 7 | 7 | 7 | 7 | 7 |
| 270 | 3 | 3 | 3 |  |  |  |  |  |
| 360 | 4 | 4 | 4 | 4 | 4 | 4 | 4 | 4 |
| 450 | 5 | 5 | 5 | 5 | 5 |  |  |  |
| 540 | 6 | 6 | 6 | 6 | 6 | 6 | 6 | 6 |
| 630 | 8 | 8 | 8 | 8 | 8 | 8 |  |  |
| 720 | 1 | 1 | 1 | 1 | 1 | 1 | 1 | 1 |

US 7,360,356 B2

EXHAUST GAS PURIFYING APPARATUS FOR INTERNAL COMBUSTION ENGINE

BACKGROUND OF THE INVENTION

The present invention relates to an exhaust gas purifying apparatus for purifying exhaust gas of an internal combustion engine.

In such an exhaust gas purifying apparatus, a catalyst arranged in an exhaust path of the engine purifies exhaust gas. For example, Japanese Laid-Open Patent Publication No. 11-294146 discloses measures for restoring the function of the catalyst for NOx (nitrogen oxides) when the catalyst is poisoned by HC (hydrocarbon). In the case of the above publication, NOx in the exhaust gas is purified by reacting with HC as the exhaust gas flows through the catalyst. For this reason, in a case of a diesel engine, since HC contained in exhaust gas is insufficient, fuel, which is light oil, is added to the catalyst to supplement the shortage of HC. However, when the light oil is added for a long period of time, the light oil that has not vaporized is absorbed by the active site of the catalyst. As a result, the catalytic activity could be significantly reduced.

The above publication discloses a method for heating the catalyst to 450° C. or more while stopping some of cylinders to restore the poisoned catalyst to an original state.

As described above, the light oil needs to be supplied to the catalyst after being sprayed into the exhaust path and vaporized. However, if the light oil is supplied to the catalyst without being sufficiently vaporized, the light oil easily adheres to the catalyst, which increases the possibility of poisoning the catalyst. In the prior art, measures for restoring the poisoned catalyst to the original state have been proposed. However, measures for preventing the catalyst from being poisoned by sufficiently vaporizing an additive have not been proposed.

SUMMARY OF THE INVENTION

Accordingly, it is an objective of the present invention to provide an exhaust gas purifying apparatus for an internal combustion engine that reliably vaporizes an additive.

One aspect of the present invention is an exhaust gas purifying apparatus for an internal combustion. The internal combustion engine includes a plurality of cylinders, a catalyst, which purifies exhaust gas discharged from the cylinders, and an additive supplying device, which supplies an additive to the catalyst. The exhaust gas purifying apparatus includes determining means for determining whether the exhaust temperature of exhaust gas needs to be increased, and control means for selecting one of an all-cylinder operation in which all the cylinders are operated and a reduced-cylinder operation in which some of the cylinders are deactivated, and controlling the operation of the cylinders based on the selected operating condition. When the control means determines that the exhaust temperature needs to be increased, the control means selects the reduced-cylinder operation.

Other aspects and advantages of the present invention will become apparent from the following description, taken in conjunction with the accompanying drawings, illustrating by way of example the principles of the invention.

BRIEF DESCRIPTION OF THE DRAWINGS

FIG. 2 is a block diagram illustrating the exhaust gas purifying apparatus;

FIG. 3 is a table for explaining an all-cylinder operation and a reduced-cylinder operation;

FIG. 4 is a flowchart for explaining a reduced-cylinder operation control;

FIG. 6(A) is a table for explaining an all-cylinder operation and a reduced-cylinder operation according to a modified embodiment; and FIG. 6(B) is a table for explaining an all-cylinder operation and a reduced-cylinder operation according to a modified embodiment.

DETAILED DESCRIPTION OF THE PREFERRED EMBODIMENTS

An exhaust gas purifying apparatus according to one embodiment of the present invention will now be described with reference to FIGS. 1 to 5. The exhaust gas purifying apparatus is mounted on a V-type 8-cylinder engine (4-cycle engine).

Figure 1:
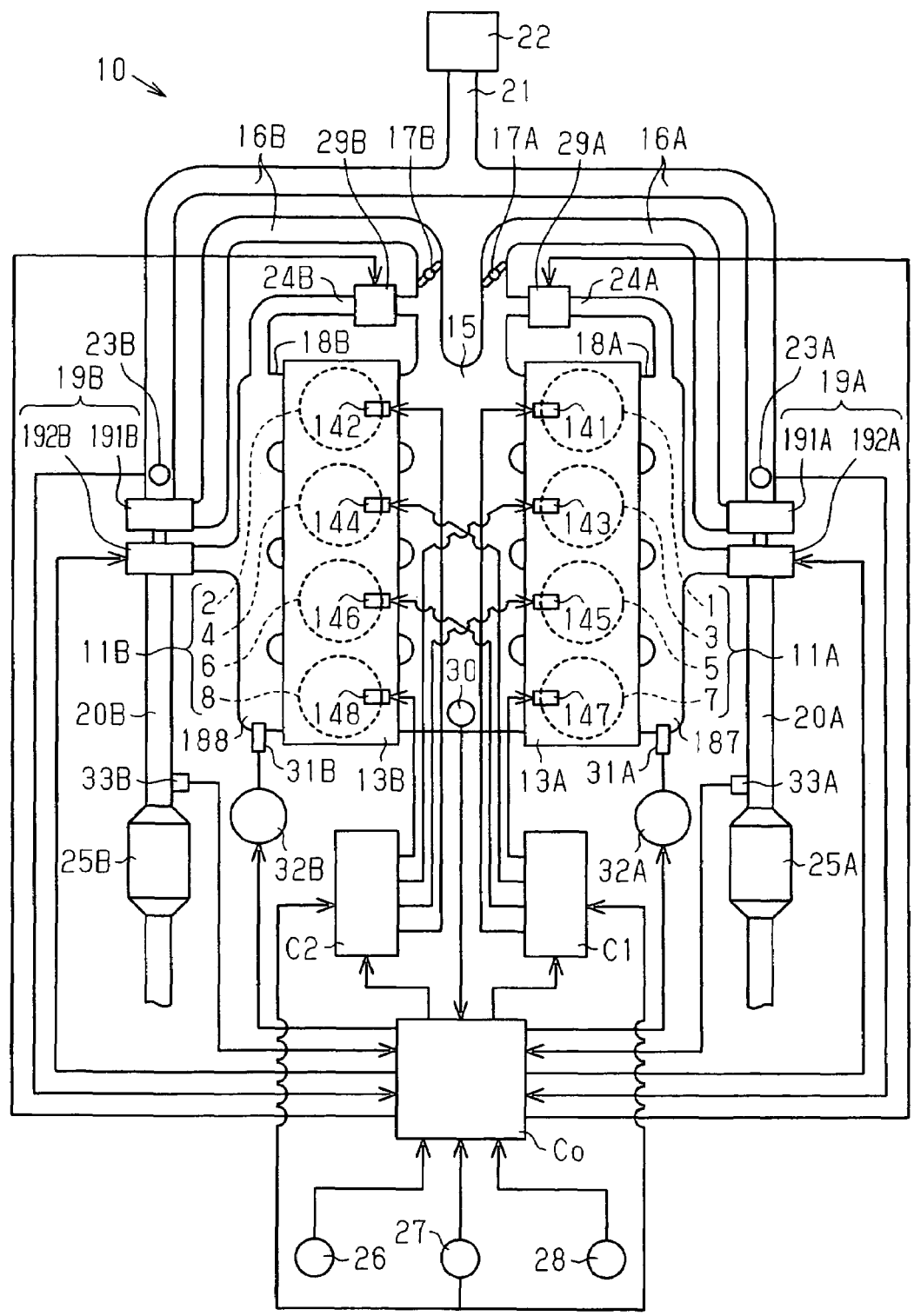
FIG. 1 is a schematic view illustrating the entire configuration of an exhaust gas purifying apparatus according to a preferred embodiment.

As shown in FIG. 1, a diesel engine 10 includes cylinders 1, 2, 3, 4, 5, 6, 7, 8. The cylinders 1 to 8 are divided into a first group 11A (the cylinders 1, 3, 5, 7) and a second group 11B (the cylinders 2, 4, 6, 8). Fuel injection nozzles 141, 143, 145, 147 are attached to a cylinder head 13A at positions corresponding to the cylinders 1, 3, 5, 7, respectively. Fuel injection nozzles 142, 144, 146, 148 are attached to a cylinder head 13B at positions corresponding to the cylinders 2, 4, 6, 8, respectively. The fuel injection nozzles 141 to 148 inject fuel (light oil) into the cylinders 1 to 8, respectively.

Intake ports (not shown) are formed in each of the cylinder heads 13A, 13B. The ends of the intake ports are connected to combustion chambers (not shown) in the cylinders and branches of an intake manifold 15. The intake manifold 15 is connected to branching intake passages 16A, 16B. A compressor 191A of a supercharger 19A is arranged in the branching intake passage 16A, and a compressor 191B of a supercharger 19B is arranged in the branching intake passage 16B. The superchargers 19A, 19B are variable nozzle turbochargers, which operate using exhaust gas.

The branching intake passages 16A, 16B are connected to a main intake passage 21. The main intake passage 21 is connected to the outside air via an air cleaner 22. A throttle valve 17A is arranged in the branching intake passage 16A, which connects the supercharger 19A to the intake manifold 15, and a throttle valve 17B is arranged in the branching intake passage 16B, which connects the supercharger 19B to the intake manifold 15. The throttle valves 17A, 17B adjust the amount of air drawn into the branching intake passages 16A, 16B via the air cleaner 22 and the main intake passage 21. The throttle valves 17A, 17B are controlled by a control section, which is a main control computer Co in this embodiment (see FIG. 2), based on the depression degree of an acceleration pedal (not shown) and other engine operating conditions.

An acceleration pedal sensor 26 detects an acceleration pedal depression degree (the depression degree of the acceleration pedal). A crank angle sensor 27 detects the crank angle (the rotational angle of a crankshaft). The information of the acceleration pedal depression degree detected by the acceleration pedal sensor 26 and the information of the crank angle detected by the crank angle sensor 27 are sent to the main control computer Co. The main control computer Co computes, based on the detected information of the acceleration pedal depression degree and the detected information of the crank angle, the fuel injection time period (timing to start injection and timing to stop injection) of the fuel injection nozzles 141 to 148. The main control computer Co also computes the engine speed N based on the detected information of the crank angle sent from the crank angle sensor 27. The main control computer Co and the crank angle sensor 27 configure engine speed detecting means, which is condition detecting means.

Air drawn into the main intake passage 21 is divided and flows into the branching intake passages 16A, 16B, and then sent to the compressors 191A, 191B of the superchargers 19A, 19B. The air sent out from the compressor 191A and the air sent out from the compressor 191B are mixed with each other in the intake manifold 15 after flowing through the branching intake passages 16A, 16B, and then supplied to the cylinders 1 to 8.

Exhaust ports (not shown) are formed in each of the cylinder heads 13A, 13B. In the cylinder head 13A, the ends of the exhaust ports are connected to the combustion chambers in the cylinders and branches of an exhaust manifold 18A. In the cylinder head 13B, the ends of the exhaust ports are connected to the combustion chambers in the cylinders and branches of an exhaust manifold 18B. Exhaust gas generated in the cylinders 1, 3, 5, 7 is discharged to the exhaust manifold 18A, and exhaust gas generated in the cylinders 2, 4, 6, 8 is discharged to the exhaust manifold 18B. The exhaust manifold 18A is connected to a first exhaust passage 20A via a turbine 192A of the supercharger 19A. The exhaust manifold 18B is connected to a second exhaust passage 20B via a turbine 192B of the supercharger 19B.

An air flow meter 23A is located in the branching intake passage 16A upstream of the compressor 191A. An air flow meter 23B is located in the branching intake passage 16B upstream of the compressor 191B. The air flow meter 23A detects the amount of air that flows through the branching intake passage 16A, and the air flow meter 23B detects the amount of air that flows through the branching intake passage 16B. The information of the flow rate of air detected by the air flow meter 23A and the information of the flow rate of air detected by the air flow meter 23B are sent to the main control computer Co.

A flow control valve 29A is arranged in an exhaust gas supply passage 24A, which connects a section of the branching intake passage 16A that is downstream of the throttle valve 17A to the exhaust manifold 18A. Likewise, a flow control valve 29B is arranged in an exhaust gas supply passage 24B, which connects a section of the branching intake passage 16B that is downstream of the throttle valve 17B to the exhaust manifold 18B. The flow control valves 29A, 29B are controlled by the main control computer Co.

A pressure sensor 30 is attached to the intake manifold 15. The pressure sensor 30 detects the pressure in the intake manifold 15. The information of the charging pressure detected by the pressure sensor 30 is sent to the main control computer Co.

The main control computer Co determines a target charging pressure in accordance with a map set in advance, based on, for example, the engine speed N and the engine load. The main control computer Co obtains the acceleration pedal depression degree as the engine load F. That is, the acceleration pedal sensor 26 serves as engine load detecting means, which is the condition detecting means. The main control computer Co controls the opening degree of vanes of the turbines 192A, 192B such that the charging pressure detected by the pressure sensor 30 becomes equal to the target charging pressure.

The main control computer Co determines the required intake flow rate from the fuel injection time period (the fuel injection amount), and further determines a target supply rate of the exhaust gas. The main control computer Co computes the opening degree of the flow control valves 29A, 29B such that the target supply rate is achieved using the information from the air flow meters 23A, 23B. The main control computer Co controls the opening degree of the flow control valves 29A, 29B such that the actual opening degree of the valves approaches the computed opening degree. When the opening degree of the flow control valves 29A, 29B is not zero, some of the exhaust gas in the exhaust manifold 18A, 18B is sent to the intake manifold 15 via the exhaust gas supply passages 24A, 24B. As described above, since some of the exhaust gas is sent to the intake manifold 15, the temperature in the combustion chambers of the cylinders 1 to 8 is decreased, which suppresses generation of NOx.

The exhaust passages 20A, 20B are provided with purifying means 25A, 25B, respectively. In the preferred embodiment, DPNR (Diesel Particulate NOx Reduction) is used as the purifying means 25A, 25B. The DPNR is formed by coating a filter base material of a DPF (Diesel Particulate Filter) with a storage reduction NOx catalyst. The DPNR purifies both of PM (Particulate matter) and NOx.

An addition nozzle 31A for injecting an additive is attached to the branch 187 of the exhaust manifold 18A corresponding to the cylinders 7. Likewise, an addition nozzle 31B for injecting the additive is attached to the branch 188 of the exhaust manifold 18B corresponding to the cylinders 8. The addition nozzles 31A, 31B are connected to pumps 32A, 32B, respectively. The pumps 32A, 32B supply the addition nozzles 31A, 31B with fuel, which is a light oil, as the additive. A pump control section, which is the main control computer Co in this embodiment, controls the operation of the pumps 32A, 32B. The addition nozzle 31A, the pump 32A, and the main control computer Co configure an additive supplying device, which supplies the additive to the purifying means 25A, and the addition nozzle 31B, the pump 32B, and the main control computer Co configure an additive supplying device, which supplies the additive to the purifying means 25B.

A temperature sensor 33A, which serves as temperature detecting means, is attached to the exhaust passage 20A upstream of the purifying means 25A. Likewise, a temperature sensor 33B, which serves as the temperature detecting means, is attached to the exhaust passage 20B upstream of the purifying means 25B. The temperature sensor 33A detects the temperature of the exhaust gas (the exhaust temperature) that flows through the exhaust passage 20A. The temperature sensor 33B detects the temperature of the exhaust gas (the exhaust temperature) that flows through the exhaust passage 20B. The information of the exhaust temperature detected by the temperature sensors 33A, 33B is sent to the main control computer Co. In the preferred embodiment, the main control computer Co configures, together with the condition detecting means and the temperature detecting means, determining means for determining whether the exhaust temperature needs to be increased.

A coolant temperature sensor 28 is connected to the main control computer Co. The coolant temperature sensor 28 detects the temperature of coolant for cooling the diesel engine 10. The coolant temperature sensor 28 serves as engine temperature detecting means, which is the condition detecting means.

As shown in FIG. 2, the main control computer Co is connected to a first control section, which is a first sub-control computer C1 in this embodiment, and a second control section, which is a second sub-control computer C2 in this embodiment. The first and second sub-control computers C1, C2 are connected to the crank angle sensor 27. The crank angle information detected by the crank angle sensor 27 is sent to the first and second sub-control computers C1, C2. The first sub-control computer C1 controls the operation of the cylinders 1, 4, 6, 7, which belong to a first cylinder group G1. The second sub-control computer C2 controls the operation of the cylinders 2, 3, 5, 8, which belong to a second cylinder group G2. That is, the first sub-control computer C1 controls the operation of the fuel injection nozzles 141, 144, 146, 147, and the second sub-control computer C2 controls the fuel injection nozzles 142, 143, 145, 148. In the preferred embodiment, the main control computer Co, the first sub-control computer C1, and the second sub-control computer C2 configure control means.

The main control computer Co outputs command signals to the first and second sub-control computers C1, C2 based on a reduced-cylinder operation control program shown in the flowchart of FIG. 4. The first sub-control computer C1 controls the operation of the first cylinder group G1 in accordance with an operation control program shown in the flowchart of FIG. 5(A). The second sub-control computer C2 controls the operation of the second cylinder group G2 in accordance with a reduced-cylinder operation control program shown in the flowchart of FIG. 5(B).

The reduced-cylinder operation control of the diesel engine 10 will now be described with reference to the flowcharts of FIGS. 4, 5(A), and 5(B).

As shown in FIG. 4, the main control computer Co receives the information such as the coolant temperature TWx, the exhaust temperatures TH1x, TH2x, the engine speed N, and the engine load F (step S1).

The main control computer Co compares the coolant temperature TWx detected at step S1 with a predetermined reference temperature TWo (step S2). When the coolant temperature TWx has not reached the reference temperature TWo, that is, when the decision outcome of step S2 is negative, the main control computer Co commands the first and second sub-control computers C1, C2 to perform all-cylinder operation (step S3).

When the coolant temperature TWx has reached the reference temperature TWo, that is, when the decision outcome of step S2 is positive, the main control computer Co compares the exhaust temperatures TH1x, TX2 detected at step S1 with a predetermined reference exhaust temperature THo (step S4). The reference exhaust temperature THo is set within a range of 200° C. to 250° C. that is suitable for vaporization of the light oil. When the exhaust temperature TH1x or the exhaust temperature TH2x has reached the reference exhaust temperature THo, that is, when the decision outcome of step S4 is positive, the main control computer Co commands the first and second sub-control computers C1, C2 to perform the all-cylinder operation (step S3).

When the exhaust temperature TH1x and the exhaust temperature TH2x have not reached the reference exhaust temperature THo, that is, when the decision outcome of step S4 is negative, the main control computer Co determines whether the combination (N-F) of the engine speed N and the engine load F detected at step S1 is within a predetermined reduced-cylinder operation allowable range (step S5). More specifically, the main control computer Co computes based on the engine speed N and the engine load F in accordance with a predetermined map. Based on the computed value, the main control computer Co determines whether the combination (N-F) of the engine speed N and the engine load F is within the reduced-cylinder operation allowable range. When the combination (N-F) is not within the reduced-cylinder operation allowable range, that is, when the decision outcome of step S5 is negative, the main control computer Co commands the first and second sub-control computers C1, C2 to perform the all-cylinder operation (step S3).

Meanwhile, when the combination (N-F) is within the reduced-cylinder operation allowable range, that is, when the decision outcome of step S5 is positive, the main control computer Co commands the first and second sub-control computers C1, C2 to perform the reduced-cylinder operation (step S6).

Figure 5A:
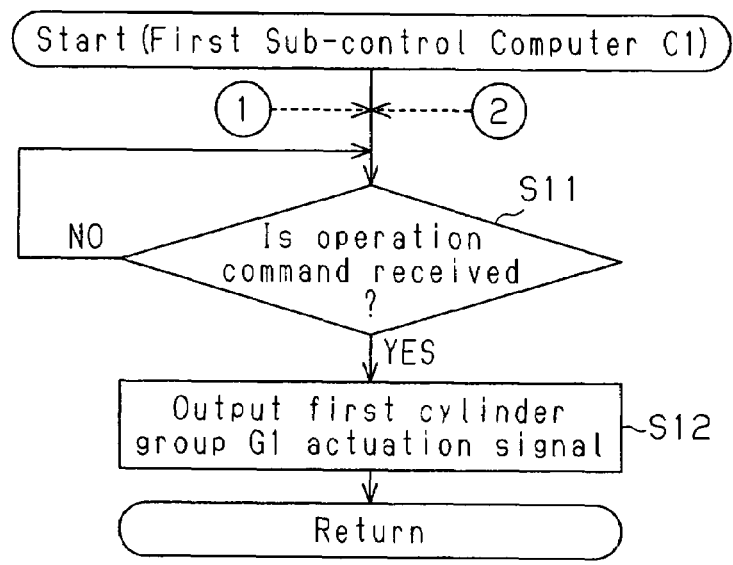
FIG. 5(A) is a flowchart for explaining the reduced-cylinder operation control.
Figure 5B:
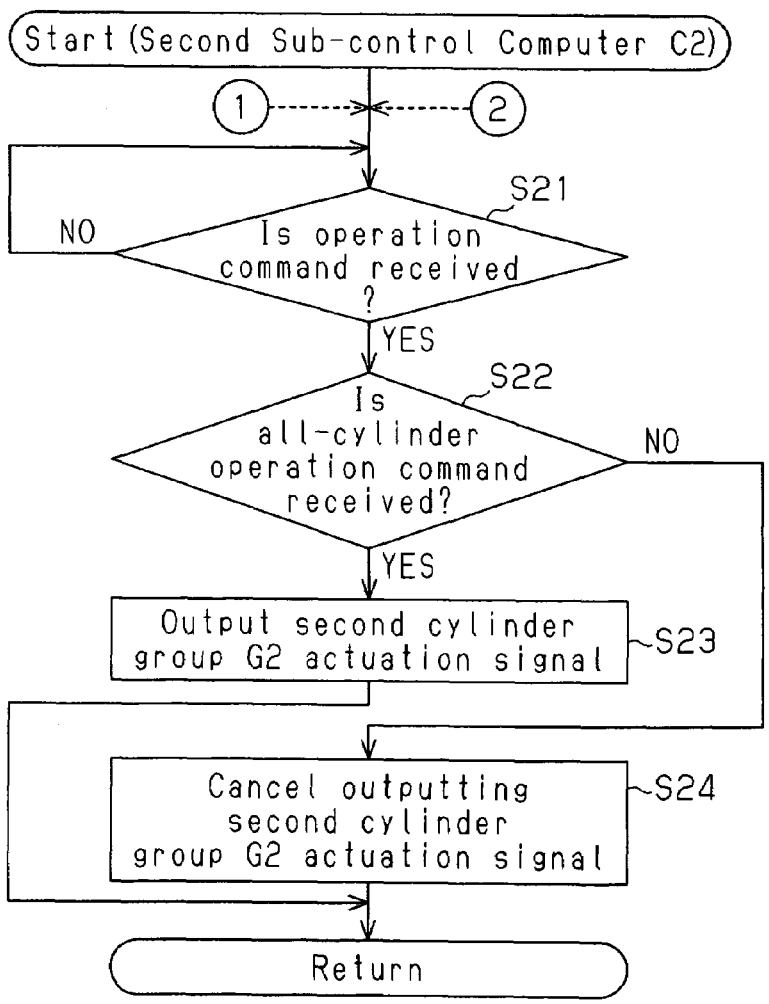
FIG. 5(B) is a flowchart for explaining the reduced-cylinder operation control.

As shown in FIGS. 5(A) and 5(B), the first and second sub-control computers C1, C2 wait for an operation command from the main control computer Co (step S11, step S21).

In response to the operation command from the main control computer Co, the first sub-control computer C1 outputs an actuation signal to the first cylinder group G1 (the cylinders 1, 4, 6, 7) (step S12). That is, the first sub-control computer C1 sequentially actuates the fuel injection nozzles 141, 144, 146, 147 corresponding to the first cylinder group G1.

Meanwhile, in response to the operation command from the main control computer Co, the second sub-control computer C2 determines whether the operation command is an all-cylinder operation command (step S22). When the operation command is the all-cylinder operation command, that is, when the decision outcome of step S22 is positive, the second sub-control computer C2 outputs an actuation signal to the second cylinder group G2 (the cylinders 2, 3, 5, 8) (step S23). That is, the second sub-control computer C2 sequentially actuates the fuel injection nozzles 142, 143, 145, 148 corresponding to the second cylinder group G2. When the operation command is a reduced-cylinder operation command, that is, when the decision outcome of step S22 is negative, the second sub-control computer C2 cancels outputting the actuation signal to the second cylinder group G2 (the cylinders 2, 3, 5, 8) (step S24).

The numerals 1, 2, 3, 4, 5, 6, 7, 8 shown in FIG. 3 represent the cylinders 1, 2, 3, 4, 5, 6, 7, 8. During the all-cylinder operation, in order to reduce vibration of the diesel engine 10 and efficiently draw in the air, fuel is injected to the cylinders 1, 2, 7, 3, 4, 5, 6, 8 in this order. During the reduced-cylinder operation, fuel is injected to the cylinders 1, 7, 4, 6 in this order, while fuel is not injected to the cylinders 2, 3, 5, 8. In the case of the 8-cylinder 4-cycle engine, the all-cylinder operation or the reduced-cylinder operation is performed assuming that 720° of crank angle is one cycle. During the all-cylinder operation, fuel is injected to the cylinders 1, 2, 7, 3, 4, 5, 6, 8 in this order at intervals of 90° of crank angle. Meanwhile, during the reduced-cylinder operation, fuel is injected to the cylinders 1, 7, 4, 6 in this order at intervals of 180° of crank angle.

The main control computer Co commands the first and second sub-control computers C1, C2 to perform the all-cylinder operation or the reduced-cylinder operation at a predetermined crank angle within 720° of crank angle (one cycle). When the operation command is the all-cylinder operation command, the first sub-control computer C1 causes fuel to be injected to the first cylinder group G1 (the cylinders 1, 4, 6, 7) at intervals of 180° based on the information of the crank angle from the crank angle sensor 27. Also, the second sub-control computer C2 causes fuel to be injected to the second cylinder group G2 (the cylinders 2, 3, 5, 8) at intervals of 180° based on the information of the crank angle from the crank angle sensor 27.

Meanwhile, when the operation command is the reduced-cylinder operation command, the first sub-control computer C1 causes fuel to be injected to the first cylinder group G1 (the cylinders 1, 4, 6, 7) at intervals of 180° based on the information of the crank angle from the crank angle sensor 27. Also, the second sub-control computer C2 stops injection of fuel to the second cylinder group G2 (the cylinders 2, 3, 5, 8), that is, the second sub-control computer deactivates the second cylinder group G2. In other words, during the all-cylinder operation, the main control computer Co performs normal control of the first and second sub-control computers C1, C2 (the operation control of the cylinders), and during the reduced-cylinder operation, the main control computer Co performs normal control of only the first sub-control computer C1 (the operation control of the first cylinder group G1). During the reduced-cylinder operation, the amount of fuel supplied to the first cylinder group G1 (the cylinders 1, 4, 6, 7) is set to twice the amount of fuel supplied during the all-cylinder operation increased by an additional amount of fuel a (twice+α).

The preferred embodiment has the following advantages.

(1) During the reduced-cylinder operation, the second cylinder group G2 (the cylinders 2, 3, 5, 8) is deactivated. That is, fuel is not injected to the cylinders 2, 3, 5, 8, and only intake, compression, and exhaust strokes are performed. The energy for performing the intake, compression, and exhaust strokes corresponds to the above mentioned additional amount of fuel α, and leads to an increase in the exhaust temperature. Therefore, the exhaust temperature of the exhaust manifold 18A and the exhaust passage 20A, which serve as a first exhaust path, and the exhaust temperature of the exhaust manifold 18B and the exhaust passage 20B, which serve as a second exhaust path, are increased. This promotes vaporization of the additive injected from the addition nozzles 31A, 31B. Thus, adhesion of the additive to the purifying means 25A, 25B is suppressed, and a decrease in the function of the catalyst is avoided.

(2) When the exhaust temperatures TH1$x$, TH2$x$ have not reached the reference exhaust temperature THo (when the temperatures are not suitable for vaporization of the additive), the reduced-cylinder operation is preferably performed. However, when the operating condition of the engine is not suitable for the reduced-cylinder operation, or more specifically, when an idling state is not stabilized, when the engine speed is high, or when the engine load is great, the all-cylinder operation is preferably performed.

When the operating condition of the engine is suitable for the reduced-cylinder operation, and the exhaust temperatures TH1$x$, TH2$x$ have not reached the reference exhaust temperature THo, the main control computer Co determines that the exhaust temperature needs to be increased (the decision outcome of step S5 is positive), and performs the reduced-cylinder operation. However, when it is determined that the operating condition of the engine is not suitable for the reduced-cylinder operation, that is, when the decision outcome of step S5 is negative, the main control computer Co does not perform the reduced-cylinder operation. That is, the main control computer Co performs the reduced-cylinder operation in accordance with the operating condition of the engine.

(3) The first sub-control computer C1 controls the operation of the first cylinder group G1 (1, 4, 6, 7), and the second sub-control computer C2 controls the operation of the second cylinder group G2 (2, 3, 5, 8). The main control computer Co sends the command signal to the first and second sub-control computers C1, C2. That is, the main control computer Co controls whether to cause signals for actuating the cylinders to be output.

In a general diesel engine, all the cylinders are arranged in series. Fuel injection control is performed by a control system in which the main control computer Co and one of the first and second sub-control computers C1, C2 are combined. Therefore, in the diesel engine 10 of the preferred embodiment, existing sub-control computers used in an inline 4-cylinder engine can be used as the first and second sub-control computers C1, C2. Therefore, the manufacturing cost for a reduced-cylinder operation control system is reduced.

(4) The main control computer Co performs the normal control of the first and second sub-control computers C1, C2 during the all-cylinder operation, and performs the normal control of only the first sub-control computer C1 during the reduced-cylinder operation. That is, combustion is sequentially performed in all the cylinders during the all-cylinder operation, while half of all the cylinders are deactivated during the reduced-cylinder operation. As described above, switching control of permitting only half of all the cylinders to operate, or deactivating half of all the cylinders simplifies the control for vaporizing the additive.

(5) The exhaust gas discharged from the cylinders 1, 3, 5, 7 is supplied to the purifying means 25A via the exhaust manifold 18A and the exhaust passage 20A (the first exhaust path). The exhaust gas discharged from the cylinders 2, 4, 6, 8 is supplied to the purifying means 25B via the exhaust manifold 18B and the exhaust passage 20B (the second exhaust path). During the all-cylinder operation, combustion gas is discharged from all the cylinders, and the flow rate of exhaust gas in the first exhaust path is equal to that in the second exhaust path.

During the reduced-cylinder operation, the first cylinder group G1 discharges combustion gas, and the second cylinder group G2 discharges only air. However, since the first cylinder group G1 is equally divided to the first group 11A and the second group 11B, the amount of combustion gas discharged to the first exhaust path is equal to the amount of combustion gas discharged to the second exhaust path during the reduced-cylinder operation. In other words, since the cylinders deactivated during the reduced-cylinder operation are equally divided to the first group 11A and the second group 11B, the increase rate of the exhaust temperature in the first exhaust path is equal to the increase rate of the exhaust temperature in the second exhaust path. Therefore, vaporizations of the additive injected from the addition nozzles 31A, 31B are equally promoted.

(6) The addition nozzle 31A injects the additive to the branch 187 corresponding to the cylinders 7, and the addition nozzle 31B injects the additive to the branch 188 corresponding to the cylinders 8. Since the branches 187, 188 are close to the cylinders 7, 8, the exhaust temperature in the branches 187, 188 is relatively higher than the exhaust temperature downstream of the branches 187, 188. Therefore, injecting the additive to the branches 187, 188 further promotes vaporization of the additive.

The preferred embodiment may be modified as follows.

When the operating condition becomes suitable for the reduced-cylinder operation, the main control computer Co may command the second sub-control computer C2 to perform the reduced-cylinder operation as shown in FIG. 6(A). In this case, the reduced-cylinder operation is performed in the order of reduced-cylinder operations 1, 2, 3, 4 in a unit of 720° crank angle (one cycle unit). During the reduced-cylinder operation 1, the cylinders 2 is deactivated, and during the reduced-cylinder operation 2, the cylinders 2, 3 are deactivated. During the reduced-cylinder operation 3, the cylinders 2, 3, 5 are deactivated, and during the reduced-cylinder operation 4, the cylinders 2, 3, 5, 8 are deactivated. That is, when shifting from the all-cylinder operation to the reduced-cylinder operation, the number of the cylinders deactivated in the second cylinder group G2 (see FIG. 2) is increased, and four cylinders are eventually stopped.

Moreover, when the operating condition becomes suitable for the reduced-cylinder operation, the main control computer Co may command the second sub-control computer C2 to perform the reduced-cylinder operation as shown in FIG. 6(B). In this case, the reduced-cylinder operation is performed in the order of reduced-cylinder operations 1, 2, 3, 4, 5, 6, 7 in a unit of 720° crank angle (one cycle unit). During the reduced-cylinder operations 1, 2, the cylinders 2 is deactivated, and during the reduced-cylinder operations 3, 4, the cylinders 2, 3 are deactivated. During the reduced-cylinder operations 5, 6, the cylinders 2, 3, 5 are deactivated, and during the reduced-cylinder operation 7, the cylinders 2, 3, 5, 8 are deactivated. That is, when shifting from the all-cylinder operation to the reduced-cylinder operation, the number of cylinders deactivated in the second cylinder group G2 (see FIG. 2) is increased, and four cylinders are eventually deactivated.

According to the modified embodiments of FIGS. 6(A) and 6(B), in the case of the reduced-cylinder operation, besides performing the normal control of the first sub-control computer C1, the main control computer Co performs transitional control of the second sub-control computer C2 before completely stopping the normal control of the second sub-control computer C2. The normal control of the first sub-control computer C1 refers to the control in which fuel injection of the first cylinder group G1 (1, 4, 6, 7) is sequentially performed at intervals of 180° of crank angle. The transitional control of the second sub-control computer C2 refers to the control in which the number of the cylinders deactivated in the second cylinder group G2 (2, 3, 5, 8) is increased.

For example, during low load operation or idling immediately after starting the engine at which the catalyst temperature becomes 200° C. or less, the injection amount of fuel is small, and the engine speed is low. Therefore, when the torque fluctuates due to the reduced-cylinder operation, irregular misfire and engine stall easily occur in the cylinders 1 to 8. In this case, the catalyst may not be sufficiently activated. According to the modified embodiments of FIGS. 6(A) and 6(B), when shifting from the all-cylinder operation to the reduced-cylinder operation, increasing the number of the cylinders that are deactivated prevents occurrence of irregular misfire and engine stall in the cylinders 1 to 8 and reduces shock and noise caused by the torque fluctuation.

Furthermore, the control shown in FIG. 6(A) may be applied during low load operation while applying the control shown in FIG. 6(B) during idling immediately after starting the engine. As described above, changing the manner of increasing the number of the cylinders to be deactivated in accordance with the operating condition of the engine more reliably prevents occurrence of irregular misfire and engine stall.

In the modified embodiment of FIG. 6(A), when the operating condition of the engine becomes no longer suitable for the reduced-cylinder operation, the reduced-cylinder operation may be executed in the order of the reduced-cylinder operations 4, 3, 2, 1. Furthermore, in the modified embodiment of FIG. 6(B), when the operating condition of the engine becomes no longer suitable for the reduced-cylinder operation, the reduced-cylinder operation may be executed in the order of the reduced-cylinder operations 7, 6, 5, 4, 3, 2, 1. That is, when shifting from the reduced-cylinder operation to the all-cylinder operation, the number of the cylinders that are deactivated in the second cylinder group G2 may be gradually reduced. This reduces shock and noise caused by torque fluctuation when shifting from the reduced-cylinder operation to the all-cylinder operation.

In the preferred embodiment, the cylinders to be deactivated during the reduced-cylinder operation may be changed from the cylinders 2, 3, 5, 8 to the cylinders 1, 4, 6, 7.

In the preferred embodiment, the addition nozzles 31A, 31B may be located in the exhaust passages 20A, 20B upstream of the purifying means 25A, 25B.

In the preferred embodiment, during the reduced-cylinder operation, the intake stroke of the second cylinder group (the cylinders 2, 3, 5, 8) or the intake and exhaust strokes of the second cylinder group (the cylinders 2, 3, 5, 8) may be stopped. In the preferred embodiment, additional energy corresponding to the above mentioned additional fuel α is consumed to perform the intake, compression, and exhaust strokes of the second cylinder group G2 that are deactivated during the reduced-cylinder operation. Since the total amount of the energy of the exhaust gas is increased as described above, vaporization of fuel injected from the addition nozzles is promoted. An engine that suppresses additional fuel from being consumed during the reduced-cylinder operation by stopping the intake stroke of the cylinders that are deactivated or the intake and exhaust strokes of the cylinders that are deactivated is disclosed in Japanese Laid-Open Patent Publication No. 54-57009. When the present invention is applied to this engine, during the reduced-cylinder operation, fuel supplied to the first cylinder group G1 is only twice the amount of fuel supplied during the all-cylinder operation, and the above mentioned additional fuel a becomes unnecessary. Therefore, the total amount of energy of the exhaust gas does not change between the all-cylinder operation and the reduced-cylinder operation. However, the energy discharged at each combustion from the cylinders of the first cylinder group G1 is twice that discharged during the all-cylinder operation. Therefore, connecting the addition nozzles to the branches of the exhaust manifold or the exhaust ports corresponding to the cylinders of the first cylinder group G1, and injecting fuel from the addition nozzles in synchronization with the discharge timing of exhaust gas further promotes vaporization of the fuel.

In the preferred embodiment, in order to efficiently vaporize fuel using the exhaust energy, fuel may be injected from the addition nozzles 31A, 31B when exhaust gas is discharged to the branches 187, 188 of the exhaust manifolds 18A, 18B. In this case, the timing at which fuel is injected from the addition nozzle 31B is preferably changed between the all-cylinder operation and the reduced-cylinder operation. More specifically, during the all-cylinder operation, fuel is preferably injected from the addition nozzle 31B in accordance with the discharge timing of exhaust gas from the cylinders 8, and during the reduced-cylinder operation, fuel is preferably injected in accordance with the discharge timing of exhaust gas from the cylinders 4 or the cylinder 6.

In the preferred embodiment, the addition nozzle may be attached to the branch of the exhaust manifold connected to the cylinders 4 or the cylinders 6. In order to facilitate attaching the addition nozzles, the addition nozzles are preferably arranged in the vicinity of the cylinders 7, 8 located at the end portion of the engine. Furthermore, in this case, the timing of fuel injection of the addition nozzle 31B is preferably changed between the all-cylinder operation and the reduced-cylinder operation. However, to promote vaporization of the added fuel, fuel is preferably injected from the addition nozzles in accordance with the discharge timing of exhaust gas from the cylinders closest to the addition nozzles. Regardless of the all-cylinder operation or the reduced-cylinder operation, the addition nozzles are preferably arranged in the cylinders from which exhaust gas is discharged, or in the exhaust port or the branches of the exhaust manifold 18B corresponding to the cylinders 4, 6, which belong to the first cylinder group G1. In this case, the exhaust energy is effectively used and fuel is efficiently vaporized.

In the preferred embodiment, the exhaust temperature in the exhaust passages 20A, 20B, which are located downstream of the purifying means 25A, 25B, may be detected. Also, either of the temperature sensors 33A, 33B may be omitted.

Based on the information such as the engine speed, the fuel injection time period (the fuel injection amount), and the air flow rate, the temperature of exhaust gas that flows through the exhaust passages 20A, 20B may be estimated. Furthermore, the temperature of the engine may be estimated based on the elapsed time from when the engine has been started.

The diesel engine 10 may be a V-type diesel engine or an inline diesel engine having even numbers of cylinders other than eight cylinders.

The invention claimed is:

1. An exhaust gas purifying apparatus for an internal combustion engine,
    wherein the internal combustion engine includes:
    an even number of the cylinders;
    a catalyst, which purifies exhaust gas discharged from the cylinders; and
    an additive supplying device, which supplies an additive to the catalyst,
    the exhaust gas purifying apparatus comprising:
    determining means for determining whether the exhaust temperature of exhaust gas needs to be increased; and
    control means for selecting one of an all-cylinder operation in which all the cylinders are operated and a reduced-cylinder operation in which some of the cylinders are deactivated, and controlling the operation of the cylinders based on the selected operating condition, and when the control means determines that the exhaust temperature needs to be increased the control means selects the reduced-cylinder operation,
    wherein the control means includes:
    a first sub-control sections which controls the operation of a first cylinder group to which half of all the cylinders belong;
    a second sub-control section, which controls the operation of a second cylinder group to which the remaining cylinders belong; and
    a main control section, which selects one of the all-cylinder operation and the reduced-cylinder operation and controls the first sub-control section and the second subcontrol section based on the selected operating condition,
    wherein, when the reduced-cylinder operation is selected, the main control section performs normal control of one of the first and second sub-control sections, and performs transitional control of the other one of the first and second sub-control sections before stopping the normal control, and the transitional control is control for increasing the number of cylinders to be deactivated in the cylinder group controlled by the other one of the first and second sub-control sections.

2. The exhaust gas purifying apparatus according to claim 1,
    wherein the determining means includes:
    condition detecting means for detecting the operating condition of the engine; and
    temperature detecting means for detecting the temperature of exhaust gas from the engine,
    wherein, when the operating condition of the engine detected by the condition detecting means is suitable for the reduced-cylinder operation, and the exhaust temperature detected by the temperature detecting means has not reached a predetermined reference exhaust temperature, the determining means determines that the exhaust temperature needs to be increased.

3. The exhaust gas purifying apparatus according to claim 2,
    wherein the condition detecting means includes engine temperature detecting means for detecting the engine temperature, and when the engine temperature detected by the engine temperature detecting means has not reached a predetermined reference temperature, the control means selects the all-cylinder operation.

4. The exhaust gas purifying apparatus according to claim 3,
    wherein the engine temperature is the temperature of coolant for cooling the engine.

5. The exhaust gas purifying apparatus according to claim 3,
    wherein the condition detecting means includes engine speed detecting means and engine load detecting means, and when the engine speed detected by the engine speed detecting means and the engine load detected by the engine load detecting means are within a reduced-cylinder operation allowable range represented by the engine speed and the engine load, and the engine temperature detected by the engine temperature detecting means has reached the reference temperature, the control means selects the reduced-cylinder operation.

6. The exhaust gas purifying apparatus according to claim 1,
    wherein, when the reduced-cylinder operation is performed, all the cylinders belonging to one of the first and second cylinder groups are simultaneously deactivated.

7. The exhaust gas purifying apparatus according to claim 1,
    further comprising a first exhaust path for exhaust gas discharged from the cylinders of a first group to which half of all the cylinders belong, and a second exhaust path for exhaust gas discharged from the cylinders of a second group to which the remaining cylinders belong, the second exhaust path being arranged in parallel to the first exhaust path, the first and second exhaust paths are each provided with a catalyst, the cylinders that are eventually deactivated during the reduced-cylinder operation include some of the cylinders of the first group and some of the cylinders of the second group, and the number of the cylinders that are eventually deactivated in the first group is equal to that in the second group.

8. The exhaust gas purifying apparatus according to claim 1,
wherein the additive supplying device has an addition nozzle, which injects the additive to an exhaust manifold.

9. The exhaust gas purifying apparatus according to claim 8,
wherein the addition nozzle is arranged close to the cylinder located at the end portion of the internal combustion engine.

10. The exhaust gas purifying apparatus according to claim 8,
wherein the additive supplying device includes a pump, which supplies the additive to the addition nozzle, and a pump control section, which controls the operation of the pump, the pump control section controlling the operation of the pump such that the additive is injected from the addition nozzle in accordance with the timing at which exhaust gas is discharged from the cylinder closest to the addition nozzle.

11. The exhaust gas purifying apparatus according to claim 2,
wherein the reference exhaust temperature is set to a range of 200° C. to 250° C.

12. The exhaust gas purifying apparatus according to claim 1,
wherein the additive is fuel for driving the internal combustion engine.

13. The exhaust gas purifying apparatus according to claim 1 mounted on a vehicle diesel engine.

14. The exhaust gas purifying apparatus according to claim 1 mounted on a V-type engine.

* * * * *

UNITED STATES PATENT AND TRADEMARK OFFICE
CERTIFICATE OF CORRECTION

| | |
|---|---|
| PATENT NO. | : 7,360,356 B2 |
| APPLICATION NO. | : 11/394553 |
| DATED | : April 22, 2008 |
| INVENTOR(S) | : Yuji Narita et al. |

It is certified that error appears in the above-identified patent and that said Letters Patent is hereby corrected as shown below:

Column 1, line 25, please delete "some of cylinders" and insert therefore -- some of the cylinders --;

Column 1, line 43, please delete "internal combustion. The" and insert therefore -- internal combustion engine. The --;

Column 5, line 52, please delete "TH1x, TX2" and insert therefore -- TH1x, TH2x --;

Column 6, line 55, please delete "4-cycle" and insert therefore -- four-cycle --;

Column 7, line 28, please delete "fuel a (twice+α)" and insert therefore -- fuel α (twice+α) --;

Column 8, line 59, please delete "branch 187 corresponding to the cylinders 7," and insert therefore -- branch 187 corresponding to the cylinder 7, --;

Column 8, line 61, please delete "corresponding to the cylinders 8." and insert therefore -- corresponding to the cylinder 8. --;

Column 9, lines 9 and 25, please delete "cylinders 2" and insert therefore -- cylinder 2 --;

Column 10, line 46, please delete "fuel a" and insert therefore -- fuel α --;

UNITED STATES PATENT AND TRADEMARK OFFICE
CERTIFICATE OF CORRECTION

PATENT NO.       : 7,360,356 B2
APPLICATION NO.  : 11/394553
DATED            : April 22, 2008
INVENTOR(S)      : Yuji Narita et al.

It is certified that error appears in the above-identified patent and that said Letters Patent is hereby corrected as shown below:

Column 11, line 3, please delete "cylinders 4" and insert therefore -- cylinder 4 --; and Column 11, line 6, please delete "cylinders 4 or the cylinders 6." and insert therefore -- cylinder 4 or the cylinder 6. --.

In Claim 1, column 11, line 60, please delete "a first sub-control sections" and insert therefore -- a first sub-control section --.

Signed and Sealed this

Sixteenth Day of December, 2008

JON W. DUDAS
*Director of the United States Patent and Trademark Office*